Figure 1:
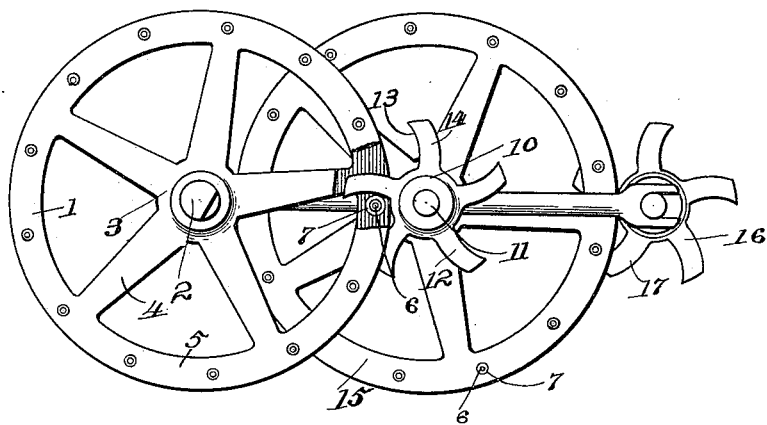

No. 619,774.  
J. F. MORGAN.  
GEARING.  
(Application filed Jan. 6, 1898.)  
Patented Feb. 21, 1899.

(No Model.)

Witnesses  
Inventor  
John F. Morgan.

UNITED STATES PATENT OFFICE.

JOHN F. MORGAN, OF POUGHKEEPSIE, NEW YORK.

GEARING.

SPECIFICATION forming part of Letters Patent No. 619,774, dated February 21, 1899.

Application filed January 6, 1898. Serial No. 665,839. (No model.)

*To all whom it may concern:*

Be it known that I, JOHN F. MORGAN, a citizen of the United States, residing at Poughkeepsie, in the county of Dutchess and State of New York, have invented certain new and useful Improvements in Gearing; and I do hereby declare the following to be a full, clear, and exact description of the invention, such as will enable others skilled in the art to which it appertains to make and use the same.

This invention relates to gearing, and while especially designed for use in driving bicycles and other foot-propelled vehicles it will be apparent as the description proceeds that the improved gearing may be used in various places and for various purposes without departing from the principle or sacrificing any of the advantages of the invention.

The invention consists in certain novel features and details of construction and arrangement of parts, as hereinafter fully described, illustrated in the drawings, and incorporated in the claims hereto appended.

Figure 2:
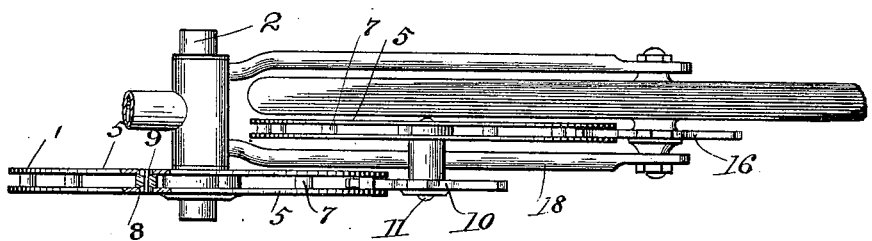

In the accompanying drawings, Figure 1 is a side elevation of the improved gearing. Fig. 2 is a plan view of the same, showing the application of the gearing to an ordinary safety-bicycle.

Similar numerals of reference designate corresponding parts in both views.

Referring to the drawings, 1 designates a large gear-wheel, which when the gearing is used upon a bicycle is mounted fast upon the crank-axle 2 of the machine. The wheel 1 is double or comprises two side portions, which include a hub 3, spokes 4, and rim 5. The two portions of the wheel 1 are similar and of equal size, and the rims are connected at intervals by pins or journals 6, upon which are mounted antifriction-rollers 7, the ends of which are hollowed out in conical form, as shown at 8, to fit upon cone-shaped projections or bearings 9, extending inwardly from the inner adjacent surfaces of the rims 5. The rollers 7 form the teeth of the wheel 1 and mesh with the teeth of a pinion 10, mounted in a counter-shaft or intermediate shaft 11, suitably secured to the machine-frame. The pinion 10 is provided with a series of teeth 12, each tooth having one concave face 13 and one convex face 14, the said concave and convex faces being substantially parallel throughout the length of the tooth and the concave face being the active or operative face of the tooth. Each tooth is thus curved from its base or junction with the hub of the pinion to its extremity, and in the revolution of the wheel 1 the teeth or rollers 7 thereof move into contact with the concave faces of the teeth of the pinion 10 and operate thereon with a cam action. The tooth or roller 7 first engages one of the teeth 12 near the outer edge of the concave face thereof and moves lengthwise of said concave face until it reaches a point near the hub of the pinion. Upon a further movement the tooth or roller 7 then travels in a reverse direction with respect to the tooth 12, moving from the inner to the outer end of the tooth and on the concave face thereof until it reaches the end of the tooth and passes therefrom, another tooth or roller 7 having in the meantime engaged the succeeding tooth of the pinion. The teeth of the pinion 10 operate between the side portions or the rims 5 of the wheel 1.

Mounted fast upon the shaft 11 is a second large gear-wheel 15, similar in construction to the wheel 1 and provided with the same kind of teeth 7. Fast upon the hub of the driving-wheel of the machine is a second pinion 16, provided with teeth 17, similar in every respect to the teeth 12 of the pinion 10, with the exception, however, that the teeth 17 are curved in a reverse direction to the teeth 12, so that the teeth of the wheel 15 will operate upon the concave faces of the teeth 17.

Where the gearing is used upon a bicycle, the pinion 16 is mounted fast on the hub of the driving-wheel inside of the rear fork 18, as shown in Fig. 2. The wheel 15 is also mounted inside of the fork, and the pinion 10 is mounted on the same shaft 11 with the wheel 15, but outside of the fork, as shown in Fig. 2. The wheel 1 is fast on the crank-axle 2, outside of the fork, adjacent to one of the cranks. It will be understood, however, that I do not desire to limit myself to the use of the improved gearing upon a bicycle or foot-propelled vehicle, but reserve the right to use the gearing wherever it may be found desirable and expedient.

Having thus described the invention, what is claimed as new, and desired to be secured by Letters Patent, is—

1. The combination with a gear-wheel having teeth in the form of rollers, of an intermeshing gear-wheel the teeth of which are curved to form concaved bearing or active surfaces, which work in contact with the roller-teeth.

2. The combination with a driving gear-wheel, of a pinion having teeth, the active faces of which are concave, substantially as described.

3. In gearing, a driving gear-wheel having a double rim and provided with teeth in the form of transverse rollers, in combination with a pinion, the teeth of which are concave upon their active faces, substantially as described.

4. In gearing, a driving gear-wheel embodying twin rims arranged side by side and having cone-shaped bearings upon their inner adjacent surfaces, and rollers fitted between said rims and having their ends hollowed or recessed to fit said cones, in combination with a pinion, the teeth of which have concave active edges for engagement with said rollers, substantially as described.

In testimony whereof I affix my signature in presence of two witnesses.

JOHN F. MORGAN.

Witnesses:
JOHN J. MYLOD,
JNO. T. NEVINS.